United States Patent
Basso et al.

(10) Patent No.: US 7,623,450 B2
(45) Date of Patent: Nov. 24, 2009

(54) METHODS AND APPARATUS FOR IMPROVING SECURITY WHILE TRANSMITTING A DATA PACKET

(75) Inventors: Claude Basso, Raleigh, NC (US); Jean Louis Calvignac, Raleigh, NC (US); Ronald Edward Fuhs, Rochester, MN (US); Nathaniel Paul Sellin, Rochester, MN (US); Colin Beaton Verrilli, Apex, NC (US); Scott Michael Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 11/388,011

(22) Filed: Mar. 23, 2006

(65) Prior Publication Data

US 2007/0223389 A1  Sep. 27, 2007

(51) Int. Cl.
  *H04L 1/00* (2006.01)
(52) U.S. Cl. .................. 370/230; 370/235; 370/395.52; 370/463
(58) Field of Classification Search ........................ None
  See application file for complete search history.

(56) References Cited

U.S. PATENT DOCUMENTS

| 6,434,620 | B1* | 8/2002 | Boucher et al. | ............. | 709/230 |
| 2004/0210663 | A1* | 10/2004 | Phillips et al. | .............. | 709/230 |
| 2007/0061492 | A1* | 3/2007 | van Riel | ........................ | 710/3 |

OTHER PUBLICATIONS

Mogul, TCP offload is a dumb idea whose time has come, HP Lab, 20 pages, 2003.*

* cited by examiner

*Primary Examiner*—Frank Duong
(74) *Attorney, Agent, or Firm*—Dugan & Dugan

(57) ABSTRACT

In a first aspect, a first method of transmitting a data packet is provided. The first method includes the steps of (1) for each connection from which a data packet may be transmitted, storing header data corresponding to the connection; (2) employing a user application to form header and payload data of a packet, wherein the user application is associated with a connection from which the packet is to be transmitted; and (3) while transmitting the packet, comparing one or more portions of the packet header data with the header data corresponding to the connection with which the user application is associated. Numerous other aspects are provided.

20 Claims, 3 Drawing Sheets

US 7,623,450 B2

METHODS AND APPARATUS FOR IMPROVING SECURITY WHILE TRANSMITTING A DATA PACKET

FIELD OF THE INVENTION

The present invention relates generally to computer systems, and more particularly to methods and apparatus for improving security while transmitting a data packet.

BACKGROUND

A computer system or the like may execute code such as an operating system (OS) and one or more user applications. In some conventional systems, a user application may store data, which is to be transmitted (e.g., from the computer system) in a packet, in a user buffer and perform an OS call. In response to the OS call, the OS may form header data for the packet and copy the user application data from the user buffer to an OS buffer so that the user application data serves as payload data of the packet.

The OS may ensure that accurate header data is placed in the packet. However, copying the user application data into the OS buffer to form the packet requires time, thereby increasing latency. Consequently, some other conventional systems may employ a method, such as TCP/IP acceleration, that enables a user application to form the packet header and payload data, thereby avoiding the data copy to an OS buffer and reducing latency. However, if user applications are enabled to form packets, accuracy of header data placed in the packet may not be ensured. For example, a malicious user application may spoof header data of the packet being formed (e.g., so as to mimic association with another connection). Consequently, improved methods and apparatus for transmitting packets of data are desired.

SUMMARY OF THE INVENTION

In a first aspect of the invention, a first method of transmitting a data packet is provided. The first method includes the steps of (1) for each connection from which a data packet may be transmitted, storing header data corresponding to the connection; (2) employing a user application to form header and payload data of a packet, wherein the user application is associated with a connection from which the packet is to be transmitted; and (3) while transmitting the packet, comparing one or more portions of the packet header data with the header data corresponding to the connection with which the user application is associated.

In a second aspect of the invention, a first apparatus for transmitting a data packet is provided. The first apparatus includes (1) a storage device; and (2) packet parsing logic coupled to the storage device. The apparatus is adapted to (a) for each connection from which a data packet may be transmitted, store header data corresponding to the connection in the storage device; (b) receive a packet whose header and payload data are formed by a user application, wherein the user application is associated with a connection from which the packet is to be transmitted; and (c) while transmitting the packet, using the packet parsing logic to compare one or more portions of the packet header data with the header data corresponding to the connection with which the user application is associated.

In a third aspect of the invention, a first system for transmitting a data packet is provided. The first system includes (1) a processor adapted to execute one or more user applications; and (2) an apparatus for transmitting a data packet, coupled to the processor, and having (a) a storage device; and (b) packet parsing logic coupled to the storage device. The system is adapted to (i) for each connection from which a data packet may be transmitted, store header data corresponding to the connection in the storage device; (ii) employ a user application to form header and payload data of a packet, wherein the user application is associated with a connection from which the packet is to be transmitted; and (iii) while transmitting the packet, use the packet parsing logic to compare one or more portions of the packet header data with the header data corresponding to the connection with which the user application is associated. Numerous other aspects are provided, as are systems and apparatus in accordance with these and other aspects of the invention.

Other features and aspects of the present invention will become more fully apparent from the following detailed description, the appended claims and the accompanying drawings.

DETAILED DESCRIPTION

The present invention provides methods and apparatus for transmitting a data packet. More specifically, the present methods and apparatus enable a user application to form a packet while reducing and/or eliminating successful transmission of a packet with inaccurate header data. In this manner, the present methods and apparatus may avoid a latency introduced when an OS of a computer system forms a packet header to be transmitted and prevent a malicious user application from spoofing packet header information.

For each connection from which data may be transmitted, the present methods and apparatus may store at least one portion of a tuple or conglomeration of information corresponding to the connection in a storage device. A user application associated with a connection may form a packet including header and payload data, and store such packet in a user buffer. The header data of such a packet may include a tuple. As the packet is transmitted (e.g., from an adapter of the computer system), packet parsing hardware may be employed to quickly extract the tuple from the packet (e.g., in real-time). The extracted tuple may be compared with a tuple associated with the connection and stored in the storage device. If the tuples do not match, the packet transmission may be stopped or intentionally corrupted such that the packet may not be used once the packet reaches its destination. Therefore, the present methods and apparatus may enable a user application to create packet header and payload data while reducing and/or eliminating successful transmission of a packet when the packet has inaccurate header data, thereby providing secure packet transmission.

Figure 1:
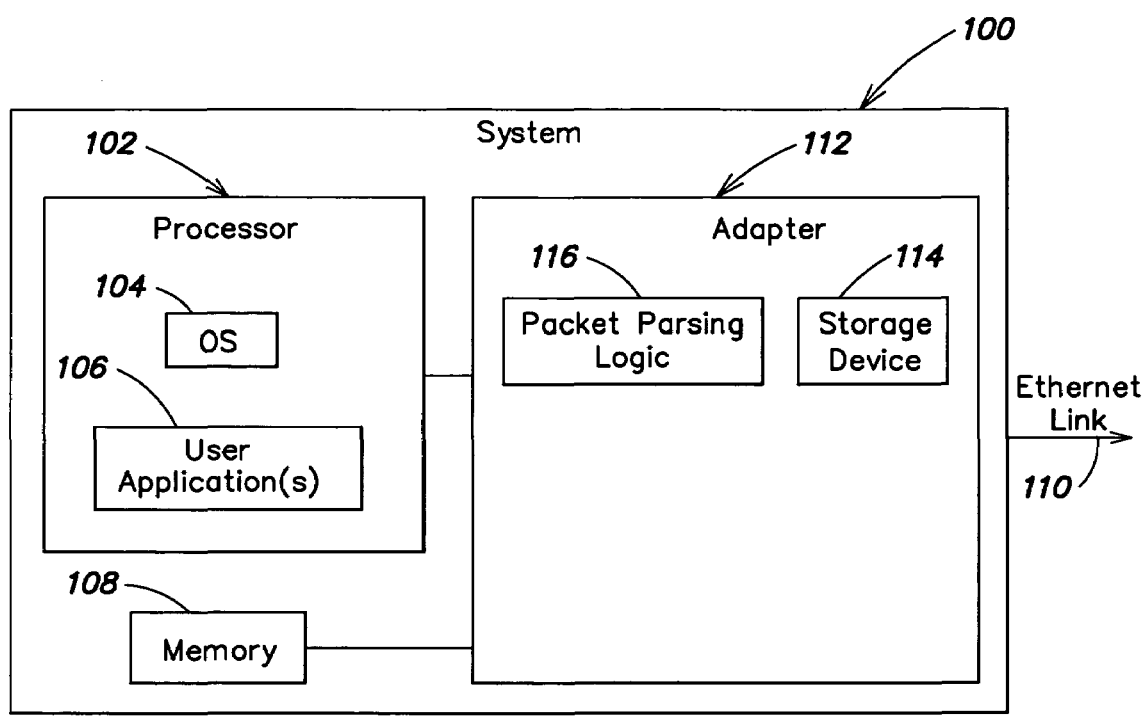
FIG. 1 is block diagram of a system for transmitting a data packet in accordance with an embodiment of the present invention.

FIG. 1 is block diagram of a system for transmitting a data packet in accordance with an embodiment of the present invention. With reference to FIG. 1, the system 100 may be a computer or the like. The system 100 may include at least one processor 102 adapted to execute code, such as an operating system (OS) 104 and/or one or more user applications 106.

Although the system 100 may employ any protocol, assume the system 100 employs the TCP/IP protocol. Typically, when employing the TCP/IP protocol, to form packets to be transmitted from the system 100, a user application 106 forms payload data while the OS 104 forms header data. More specifically, the OS 104 may create header data and copy user application data from a user buffer to an OS buffer. Consequently, a large OS processing overhead is created. To reduce a burden on the OS 104, the system 100 may employ a method, such as an improved TCP/IP acceleration, which enables a user application 106 to form a data packet to be transmitted (e.g., from the system 100). Therefore, the system 100 may shift much of the work performed by the OS 104 while forming a packet to a user application 106. Because the user application forms the data packet, the OS may not be required to copy data from a user buffer to an OS buffer to form the data packet, thereby reducing system latency. Further, as described below, in contrast to conventional TCP/IP acceleration, the present methods, which enable a user application 106 to form a data packet, may ensure accuracy of packet header data formed by the user application 106. In this manner, successful transmission of a packet including header data spoofed by a malicious user application 106 may be reduced and/or eliminated, thereby improving data security.

The system 100 may include a memory 108 one or more portions of which may serve as a buffer for storing user application data, such as header and payload data of a packet created by the user application 106. The processor 102 and memory 108 may be coupled to a networked link or fabric 110 (e.g., an Ethernet or another suitable link or fabric) via an adapter 112, such as a network interface card or the like. The link 110 may represent a plurality of connections. The adapter 112 may be configured to transmit a data packet while reducing system latency and improving data security. The adapter 110 may include a storage device 114 adapted to store header data or information corresponding to each connection from which data may be transmitted (e.g., from the system 100). For example, during system setup, a plurality of such connections may be established. During such time, respective tuples or conglomerations of information may be created for such connections. One or more portions of each such tuple may be stored by the storage device 114. In some embodiments, the storage device 114 may store a queue pair context (similar to that employed in an Infiniband protocol) for each connection. However, the queue pair context may include one or more portions of an associated tuple, for each connection. The tuple or queue pair context may be employed to validate that a user application may have authority to send a packet formed thereby to its targeted destination. The entire tuple (or queue pair context) or a subset thereof (e.g., a Media Access Control (MAC) source address, MAC destination address, Transport Control Protocol (TCP) source address, TCP destination address) may be employed.

Alternatively, in some embodiments, rather than storing a full version of the header data or information (e.g., tuple) corresponding to each connection in the storage device 114, a reduced version of such data (e.g., a version with less bytes) may be stored in the storage device 114. For example, a hashing or another suitable algorithm may be performed on the full version of the header data or information corresponding to each connection to form the reduced version of (e.g., a hash of) such data.

Additionally, the adapter 112 may include hardware, such as packet parsing logic 116, adapted to monitor a data packet formed by a user application 106 as such data packet is being transmitted. During such transmission, the packet parsing logic 116 may monitor the data packet for specific header fields and extract such fields. For example, the packet parsing logic 116 may be adapted to monitor the data packet transmission and extract the tuple from the data packet during transmission. The adapter 112 may be configured to compare one or more portions of the extracted tuple to the header data or information corresponding to the connection with which the user application 106 that formed the packet is associated.

Figure 2:
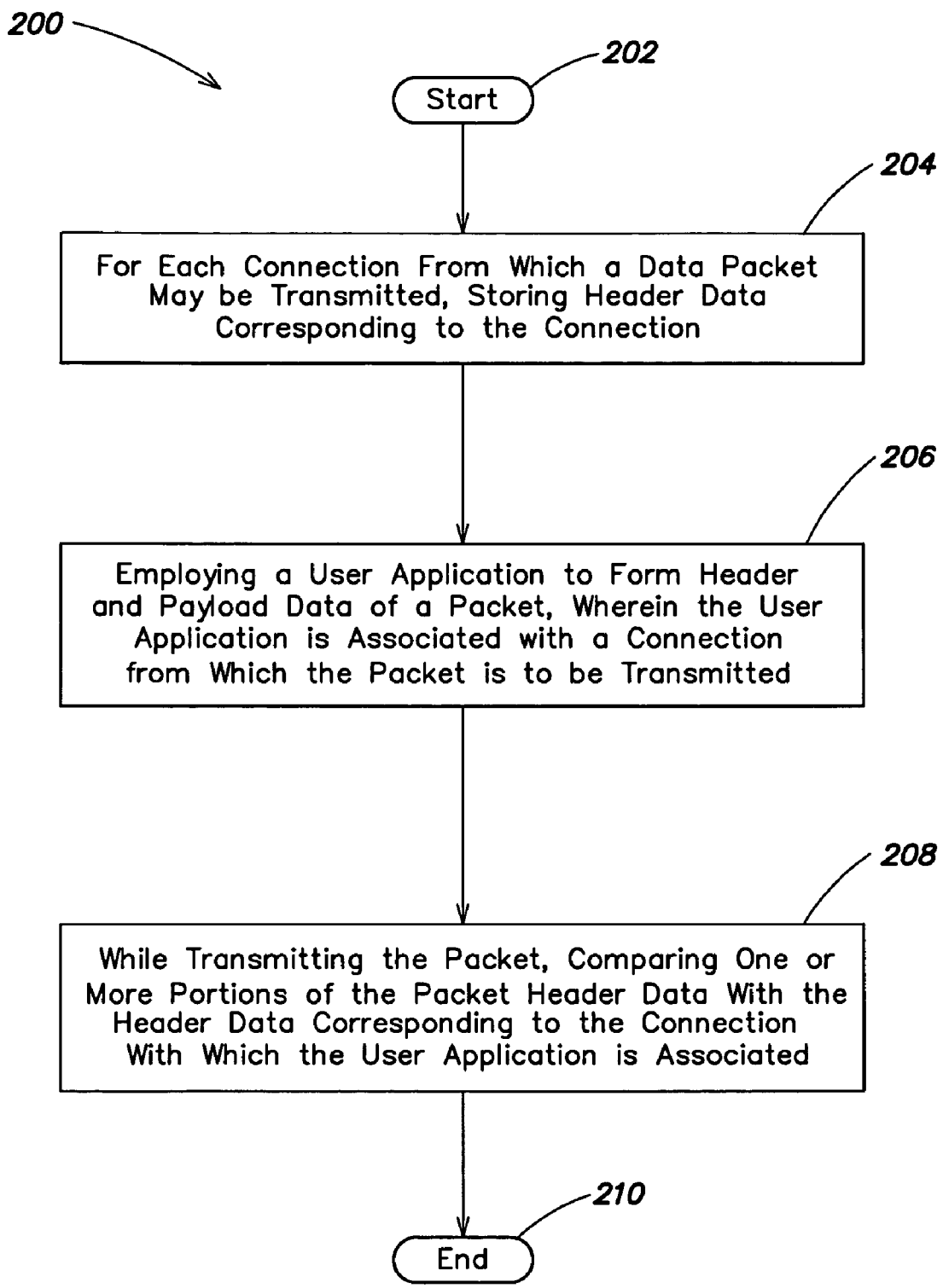
FIG. 2 illustrates a method of transmitting a data packet in accordance with an embodiment of the present invention.

Operation of the system 100 for transmitting a packet is now described with reference to FIG. 2, which illustrates a method of transmitting a data packet in accordance with an embodiment of the present invention. With reference to FIG. 2, in step 202, the method 200 begins. In step 204, for each connection from which a data packet may be transmitted, header data corresponding to the connection may be stored. For example, during setup, the system 100 may establish connections (e.g., from which data may be transmitted) associated with respective user applications 106. The system 100 may store respective header data of information (e.g., a tuple) corresponding to each connection from which data may be transmitted. The header data or information may be a portion of a queue pair context stored for each connection. In this manner, queue pair contexts may be associated with connections, respectively. Each queue pair context may include information specific to the user connection associated therewith. A queue pair context for each connection may be set up by trusted code of the OS when the connection is established. The queue pair context for each connection may include, among other things, permission information, locations of user buffers and completion signaling information. Permission information may indicate portions of the memory 108 which a user application 106 may access. Location of user buffers may indicate where data should be placed when received. Completion signaling information may indicate when the system 100 should inform a user application 106 about a packet. Additionally, as stated above, in accordance with the present methods and apparatus, the queue pair context may include the tuple (e.g., Ethernet MAC source address, IP source address, IP destination address, TCP source port, TCP destination port and/or the like) corresponding to the connection from which a packet will be sent.

Each tuple may be greater than 100 bytes (e.g., 106 bytes) in size. Therefore, if the system 100 supports many connections, silicon requirements to hold a tuple corresponding to each connection may be substantial. Consequently, the system 100 may create and store a reduced version of (e.g., a hash of) header data information corresponding to each connection from which data may be transmitted (e.g., from the system 100). In this manner, for each connection, the system 100 may store information that should be included in header data of a packet to be transmitted from the connection (or a reduced version thereof).

In step 206, a user application 106 may be employed to form header and payload data of a packet (e.g., TCP/IP packet), wherein the user application 106 is associated with a connection from which the packet is to be transmitted. More specifically, the user application 106 may store the packet header and payload data in memory 108 (e.g., a user buffer included therein). The header data of the packet to be transmitted via the connection may include a tuple. The tuple may include information that uniquely identifies a connection (e.g., on which the packet is to be transmitted). For example, the tuple may include an Ethernet MAC source address, a VLAN tag, Ethernet priority bits, IP source and/or destination addresses, TCP source and/or destination ports, an identifier/protocol, SYN bits of a TCP packet and/or logical port indicators. Such fields are known to one of skill in the art. However, the tuple may include a larger or smaller amount of and/or different information. By employing a user application 106 to form a data packet, the system 100 may offload the OS of such responsibility. For example, the OS 104 may not be required to copy user application data from memory 108 (e.g., a user buffer included therein) to an OS buffer. Consequently, system latency may be reduced. If the user application 106 is malicious, it may spoof header data of the packet to be transmitted on a connection so that a different connection may be corrupted. For example, the malicious user application 106 may spoof the packet header data by changing one or more portions of the packet tuple so the packet will be routed to a connection other than the connection associated with the user application 106.

In step 208, while transmitting the packet, one or more portions of the packet header data may be compared with the header data corresponding to the connection with which the user application is associated. For example, when a user application 106 forms packet header and payload data, the user application 106 may inform the system 100 to transmit the packet. In response, the system 100 may pull or retrieve such data from the memory 108 (e.g., a user buffer included therein) and begin sending the data to the wire (e.g., Ethernet link 110). More specifically, the system 100 may provide the data packet created by the user application 106 to the adapter 112 through which the packet may be transmitted on the connection (e.g., via the link 110). While the packet is transmitted on the connection, the packet parsing logic 116 may monitor the packet transmission and extract portions of the header data or information (e.g., tuple) from the packet. Parsing the packet in this manner to determine desired header data or information (e.g., the tuple) is a much simpler task than supplying full permutations of all possible header combinations to determine such desired header data or information. The adapter 112 may compare the extracted information to the header data or information corresponding to the connection stored by the storage device 114. For example, once the packet tuple has been extracted, the packet tuple may be compared with a tuple stored in a queue pair context. If the extracted information matches the header data or information corresponding to the connection stored by the storage device 114, the packet header data has not been spoofed, and therefore, the packet may successfully be transmitted to its destination via the connection.

Alternatively, if the extracted information does not match the header data or information corresponding to the connection stored by the storage device, the user application 106 may have spoofed one or more portions of the data packet. Therefore, the system 100 may stop transmission (e.g., prematurely abort the packet sending stream) of the spoofed packet. Alternatively, the system 100 may intentionally corrupt such packet (e.g., by corrupting a cyclic redundancy check (CRC) value of the packet). When such a packet is received in the packet destination, the CRC value will indicate the packet is corrupted, and therefore, should be dropped by the receiver (e.g., the packet destination). In this manner, the packet may be dropped and the malicious user application 106 may be prevented from harming a connection different than that associated with the user application 106. Thus, parsing may be employed during packet transmission to provide security checks.

By performing such a comparison while transmitting the data (e.g., in real-time), the system 100 may avoid a latency of storing data packets associated with a store-and-forward method of transmitting data packets. Further, the comparison may provide secure (e.g., 100% secure) data packet transmission by ensuring an accuracy of packet header data. However, comparing the extracted information to a reduced version of the header data may not provide 100% security, but such a comparison may provide security sufficient for many data packet transmission applications. For example, the comparison may reduce and/or eliminate a chance that a spoofed packet is successfully transmitted. Thus, a user application 106 may not successfully pretend to be associated with another connection, because if the user application 106 pretends to be associated with another connection, a packet created by the user application 106 may be dropped. In this manner, the present methods and apparatus may provide security by providing real-time hardware checking without impacting performance. In summary, the present methods and apparatus may parse packet header data as a packet is sent to the wire, and verify the user application 106 which formed the packet has authority to send the packet to its targeted destination by comparing information (e.g., a tuple) in the packet being transmitted with information corresponding to a connection with which the user application 106 is associated.

Thereafter, step 210 may be performed. In step 210, the method ends. Through use of the present methods and apparatus, the present methods and apparatus may enable a user application to create packet header and payload data while reducing and/or eliminating successful transmission of a packet with inaccurate header data, thereby allowing secure packet transmission. For example, the present methods and apparatus may provide an improved TCP/IP acceleration engine. The improved TCP/IP acceleration engine not only off-loads responsibility from the OS 104 but also implements packet transmission security features. To wit, the present methods and apparatus may take advantage of TCP/IP off-load, which frees up the OS resources and improves latency while providing security which may prevent a user application 106 from corrupting connections that the user application 106 should not be communicating with.

More specifically, the present methods and apparatus may be implemented in an Ethernet environment to allow a user application 106, rather than the OS 104, the ability to create packets (including header data thereof) and send such packets directly to the adapter 112. The present methods and apparatus may ensure accuracy of header data of packets created by a user application 106, thereby preventing a malicious user program or application 106 from spoofing header data (e.g., to mimic another TCP/IP connection and corrupt data). For example, the present methods and apparatus may prevent spoofing at a media access card (MAC) sub-layer, by preventing the user application 106 from changing a MAC source address (SA) without detection.

In a networked environment, such as Ethernet, hundreds, thousands or more connections may exist. The present methods and apparatus may account for the numerous connections while providing secure transmission of data packets, which are created by user applications 106, thereon. In this manner, the present methods and apparatus may provide a level of network security which already exists when the OS creates data packets (e.g., and headers included therein) to a system environment in which a user application 106 has direct control of packets provided on the Ethernet link or wire 110 (e.g., when a user application 106 may create packet header and payload data).

By enabling software (e.g., a user application 106) to create a data packet (including header data thereof), the present methods may avoid problems of employing hardware to form header data. For example, employing hardware to form header data of an Ethernet packet is difficult. Ethernet may have many protocols and many variations thereof. For instance, internet protocol (IP) packets may have 0-40 bytes of options. Transport control protocol (TCP) packets may have a similar amount of options. Further, an Ethernet packet may be DIX, SNAP, LLC or another suitable type which may or may not include VLAN tags. The format of the packet header data may be based on or change with the type of Ethernet packet. Additionally, user applications may implement protocols other than TCP/IP. Consequently, designing hardware that may handle all the combinations of protocols and provide adequate security checking is difficult.

Figure 3:
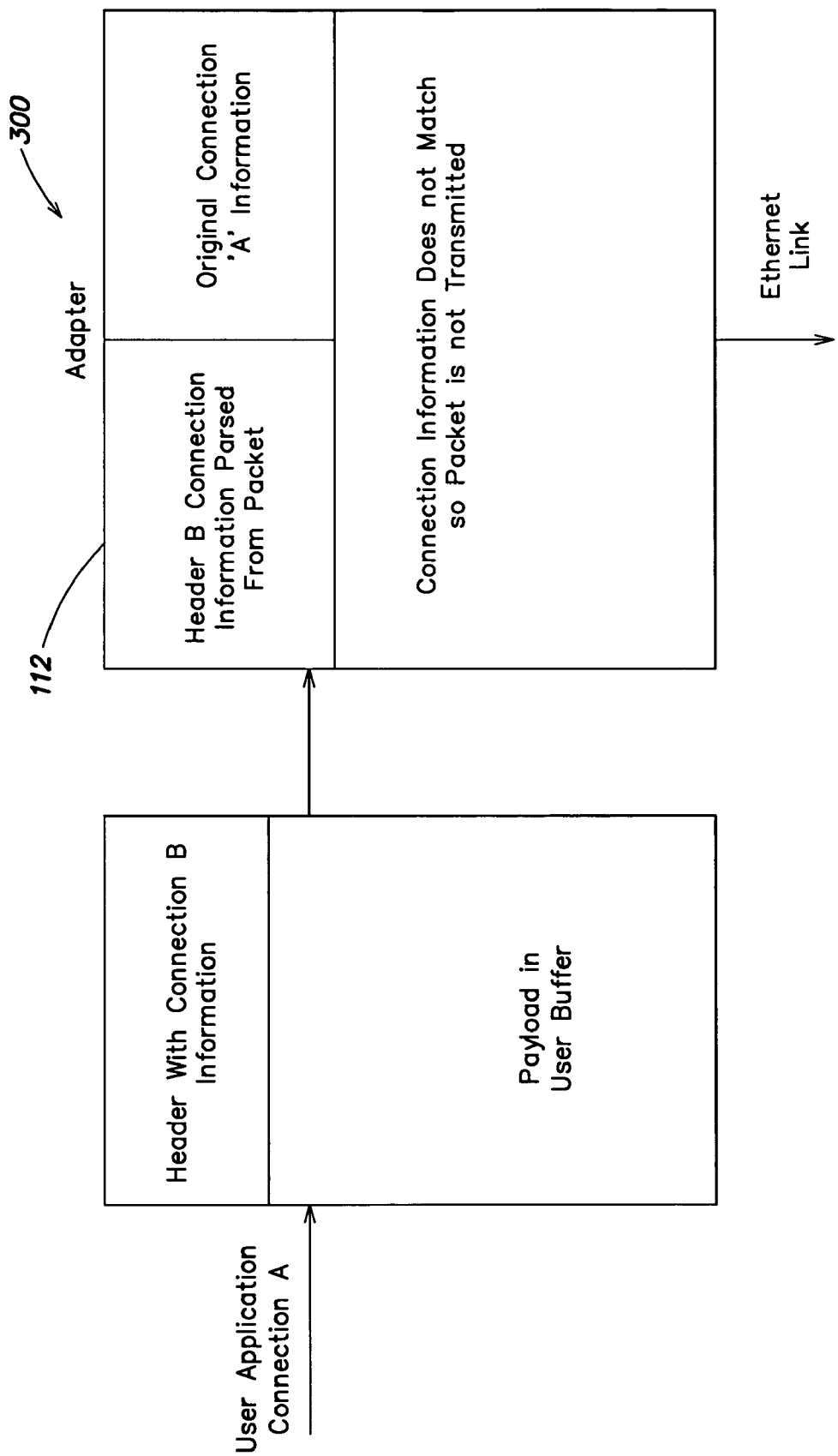
FIG. 3 illustrates an exemplary process flow of the method of transmitting a data packet in accordance with an embodiment of the present invention.

FIG. 3 illustrates an exemplary process flow 300 of the method of transmitting a data packet in accordance with an embodiment of the present invention. With reference to FIG. 3, a user application 106 may form a packet to be transmitted via connection A. The user application 106 may store packet payload data in the memory 108 (e.g., in a user buffer included therein). However, the user application 106 may be malicious. Therefore, rather than include packet header data associated with connection A, the user application 106 may include packet header data associated with connection B in the packet. The system 100 may provide the data packet created by the user application 106 to the adapter 112 through which the packet may be transmitted on the connection (e.g., via the link 110). While the packet is transmitted on the connection, the packet parsing logic 116 may parse or extract from the packet header data which is associated with connection B. The adapter 112 may compare such extracted header data with the header data or information corresponding to connection A stored by the storage device 114 (e.g., during system setup). Because such information does not match, the packet formed by the user application 106 may not be transmitted (e.g., transmission of the packet may be stopped). As shown, according to the present methods and apparatus, a connection may be established (e.g., during system setup) which has a specific tuple associated therewith. Such tuple may be stored in a storage device 114. During system operation, when a user application 106 associated with a connection creates a data packet including a tuple that does not match the tuple associated with the connection (stored by the storage device), the system 100 may drop the packet.

The foregoing description discloses only exemplary embodiments of the invention. Modifications of the above disclosed apparatus and methods which fall within the scope of the invention will be readily apparent to those of ordinary skill in the art. For instance, although the above system 100 employs an improved method which enables a user application 106 to form a data packet, the system 100 may also still enable the OS to form data packets in a conventional manner.

Accordingly, while the present invention has been disclosed in connection with exemplary embodiments thereof, it should be understood that other embodiments may fall within the spirit and scope of the invention, as defined by the following claims.

The invention claimed is:

1. A method of transmitting a data packet, comprising:
   for each connection from which a data packet is transmitted, storing header data corresponding to the connection;
   employing a user application to form header and payload data of a packet, wherein the user application is associated with a connection from which the packet is to be transmitted; and
   while transmitting the packet, comparing with packet parsing logic one or more portions of the packet header data with the header data corresponding to the connection with which the user application is associated.

2. The method of claim 1 wherein employing a user application to form header and payload data of the packet includes reducing a latency to form the packet.

3. The method of claim 1 wherein comparing with the packet parsing logic one or more portions of the packet header data with the header data corresponding to the connection with which the user application is associated includes reducing successful transmission of a packet with inaccurate header data.

4. The method of claim 1 wherein comparing with packet parsing logic one or more portions of the packet header data with the header data corresponding to the connection with which the user application is associated includes:
   extracting portions of the packet header data with the packet parsing logic; and
   comparing with the packet parsing logic the extracted portions of the packet header data with the header data corresponding to the connection with which the user application is associated.

5. The method of claim 1 further comprising stopping packet transmission if the one or more portions of the packet header data do not match the header data corresponding to the connection with which the user application is associated.

6. The method of claim 1 further comprising corrupting the packet if the one or more portions of the packet header data do not match the header data corresponding to the connection with which the user application is associated.

7. The method of claim 1 wherein:
   storing header data corresponding to the connection includes storing a reduced version of header data corresponding to the connection; and
   comparing with packet parsing logic one or more portions of the packet header data with the header data corresponding to the connection with which the user application is associated includes comparing with the packet parsing logic one or more portions of the packet header with the reduced version of the header data corresponding to the connection with which the user application is associated.

8. An apparatus for transmitting a data packet, comprising:
   a storage device; and
   packet parsing logic coupled to the storage device;
   wherein the apparatus is adapted to:
      for each connection from which a data packet is transmitted, store header data corresponding to the connection in the storage device;
      receive a packet whose header and payload data are formed by a user application, wherein the user application is associated with a connection from which the packet is to be transmitted; and
      while transmitting the packet, using the packet parsing logic to compare one or more portions of the packet header data with the header data corresponding to the connection with which the user application is associated.

9. The apparatus of claim 8 wherein the apparatus is further adapted to reduce successful transmission of a packet with inaccurate header data.

10. The apparatus of claim 8 wherein the apparatus is further adapted to:
    extract portions of the packet header data; and
    compare the extracted portions of the packet header data with the header data corresponding to the connection with which the user application is associated.

11. The apparatus of claim 8 wherein the apparatus is further adapted to stop packet transmission if the one or more portions of the packet header data do not match the header data corresponding to the connection with which the user application is associated.

12. The apparatus of claim 8 wherein the apparatus is further adapted to corrupt the packet if the one or more portions of the packet header data do not match the header data corresponding to the connection with which the user application is associated.

13. The apparatus of claim 8 wherein the apparatus is further adapted to:
   store a reduced version of header data corresponding to the connection; and
   compare one or more portions of the packet header data with the reduced version of the header data corresponding to the connection with which the user application is associated.

14. A system, comprising:
   a processor adapted to execute one or more user applications; and
   an apparatus for transmitting a data packet, coupled to the processor, and having:
      a storage device; and
      packet parsing logic coupled to the storage device;
   wherein the system is adapted to:
      for each connection from which a data packet is transmitted, store header data corresponding to the connection in the storage device;
      employ a user application to form header and payload data of a packet, wherein the user application is associated with a connection from which the packet is to be transmitted; and
      while transmitting the packet, use the packet parsing logic to compare one or more portions of the packet header data with the header data corresponding to the connection with which the user application is associated.

15. The system of claim 14 wherein the system is further adapted to reduce a latency to form the packet.

16. The system of claim 14 wherein the system is further adapted to reduce successful transmission of a packet with inaccurate header data.

17. The system of claim 14 wherein the system is further adapted to:
   extract portions of the packet header data; and
   compare the extracted portions of the packet header data with the header data corresponding to the connection with which the user application is associated.

18. The system of claim 14 wherein the system is further adapted to stop packet transmission if the one or more portions of the packet header data do not match the header data corresponding to the connection with which the user application is associated.

19. The system of claim 14 wherein the system is further adapted to corrupt the packet if the one or more portions of the packet header data do not match the header data corresponding to the connection with which the user application is associated.

20. The system of claim 14 wherein the system is further adapted to:
   store a reduced version of header data corresponding to the connection; and
   compare one or more portions of the packet header data with the reduced version of the header data corresponding to the connection with which the user application is associated.

\* \* \* \* \*